United States Patent [19]
Knutsen, II

[11] Patent Number: 5,832,517
[45] Date of Patent: Nov. 3, 1998

[54] SYSTEM LOGGING USING EMBEDDED DATABASE

[75] Inventor: Wallace Dale Knutsen, II, San Francisco, Calif.

[73] Assignee: Xerox Corporation, Stamford, Conn.

[21] Appl. No.: 906,069

[22] Filed: Aug. 5, 1997

Related U.S. Application Data

[63] Continuation of Ser. No. 174,963, Dec. 29, 1993, abandoned.

[51] Int. Cl.⁶ .................................................. G06F 17/30
[52] U.S. Cl. ............................................ 707/202; 707/8
[58] Field of Search ........................... 707/202, 201, 707/203, 8, 9, 10

[56] References Cited

U.S. PATENT DOCUMENTS

| | | | |
|---|---|---|---|
| 4,498,145 | 2/1985 | Baker et al. | 395/600 |
| 4,864,497 | 9/1989 | Lowry et al. | 395/600 |
| 5,212,788 | 5/1993 | Lomet et al. | 395/600 |
| 5,216,592 | 6/1993 | Mann et al. | 364/401 |
| 5,226,161 | 7/1993 | Khoyi et al. | 395/650 |
| 5,390,302 | 2/1995 | Johnson et al. | 395/325 |
| 5,452,445 | 9/1995 | Hallmark et al. | 395/600 |
| 5,561,797 | 10/1996 | Gilles | 395/600 |

OTHER PUBLICATIONS

"How to get commitment from distributed database", Dennis Eskew, Corporate Computing, v2, n2, p. 181(2), Feb. 1993.

"Transaction Support in a Log–structured Fiel System", Margo I. Seltzer, Proceedings of the 1993 Data Engineering 9th International Conference, IEEE Computer Society Press, USA, Apr. 1993.

Primary Examiner—Thomas G. Black
Assistant Examiner—Hosain T. Alam
Attorney, Agent, or Firm—Towsend and Townsend and Crew LLP

[57] ABSTRACT

A robust integrated database system merging operations from two or more individual database systems that uses a system logging table created in one of the databases to log system data and requested changes to the system data. The inherent robustness developed for one database is exploited to provide robustness for the entire integrated system. During normal operation, the system logging table stores log data. After a failure, the log data in the system table allows an integrator to query the databases as to the status of any previously pending operations and to thereby recover from the failure.

2 Claims, 5 Drawing Sheets

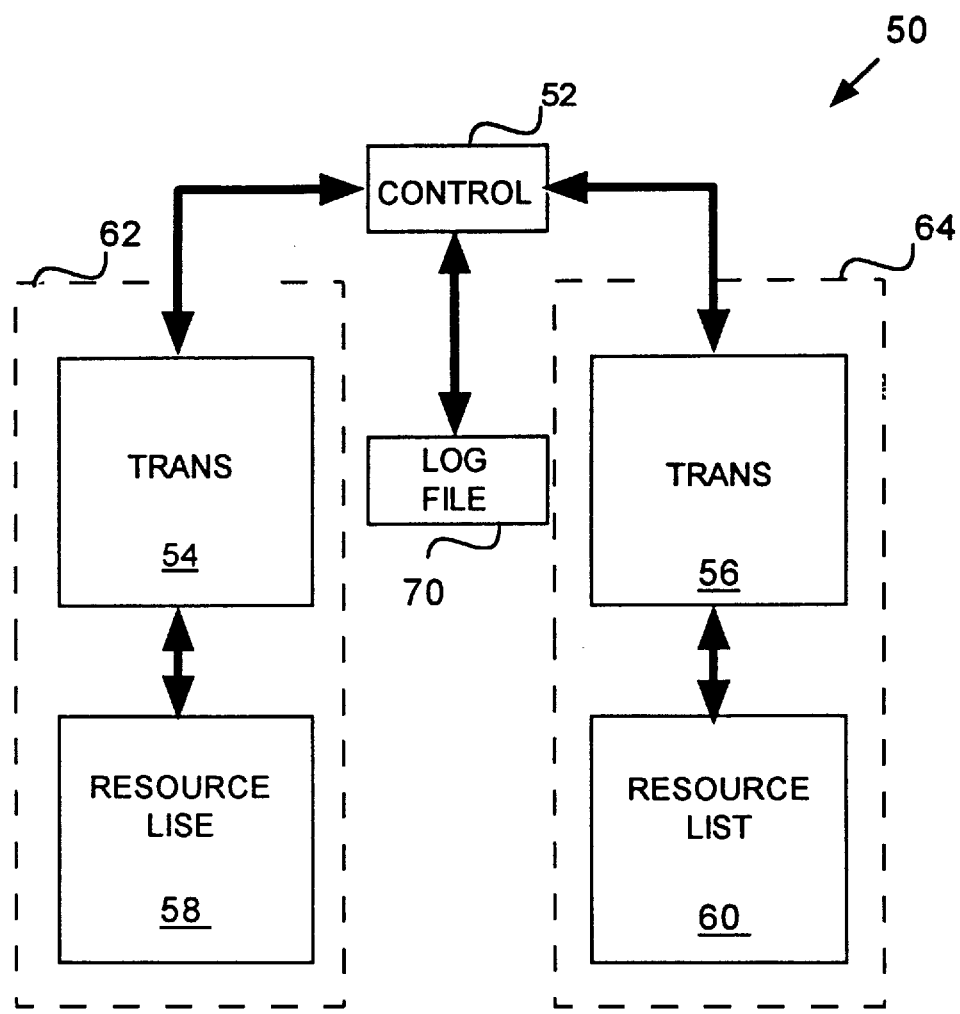
Fig_1
(PRIOR ART)

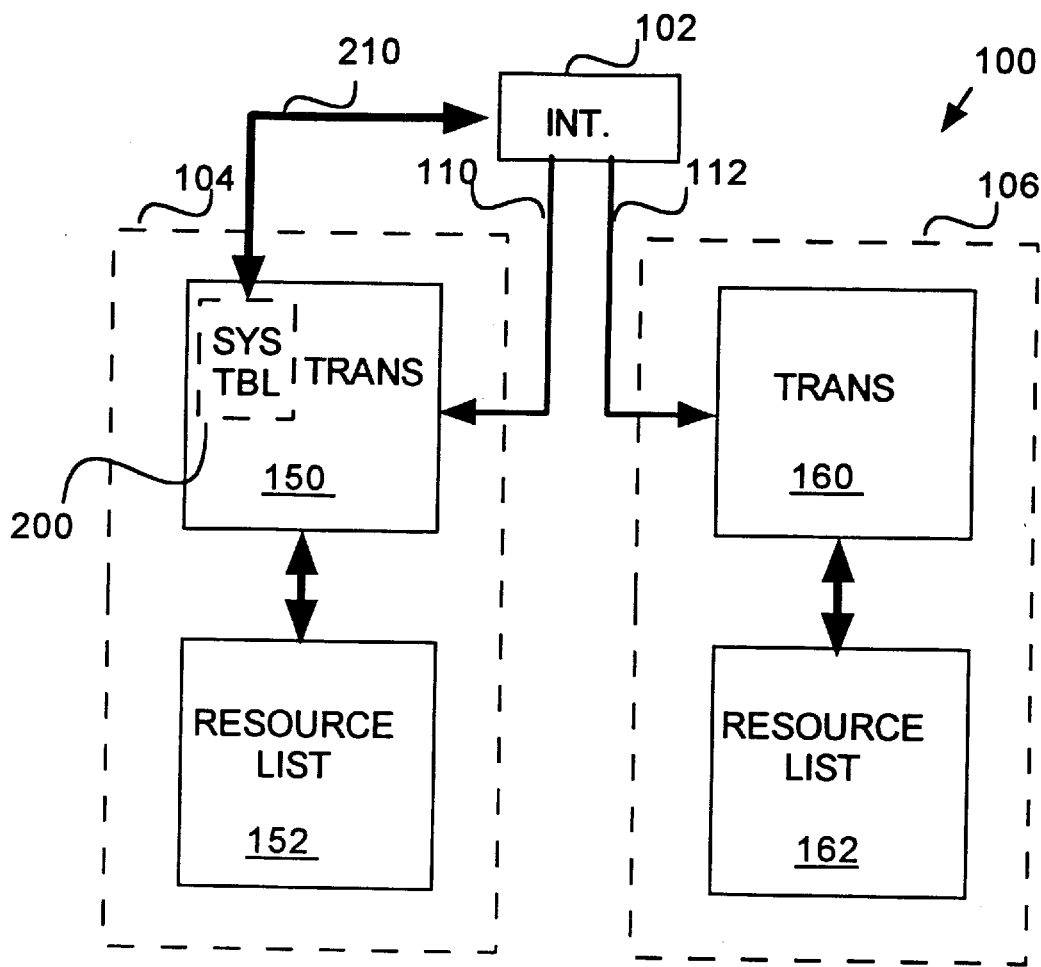
Fig_2

| | SYSTEM TABLE 200 | |
|---|---|---|
| CUSTOMER | Trans#1_ID | Trans#2_ID |
| Smith | Trans#1_ID#1 | Trans#2_ID#1 |
| Green | Trans#1_ID#2 | Trans#2_ID#2 |
| ... | ... | ... |

$310_1$, $310_2$, $310_i$ — 300, 302, 304

Fig_3

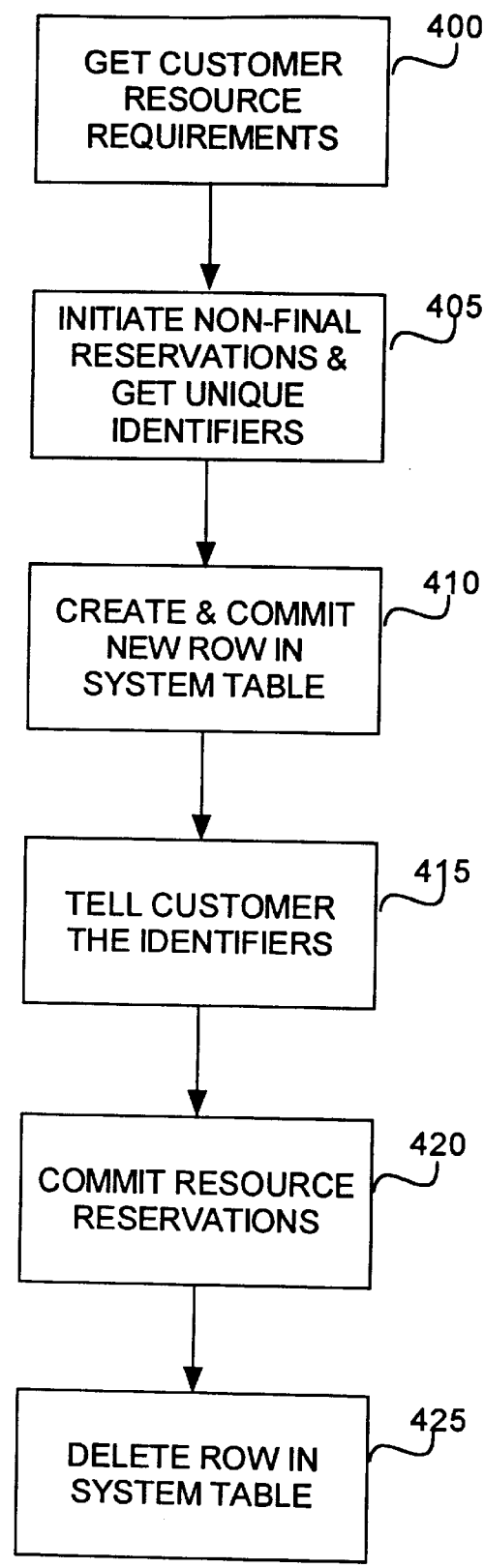
Fig_4

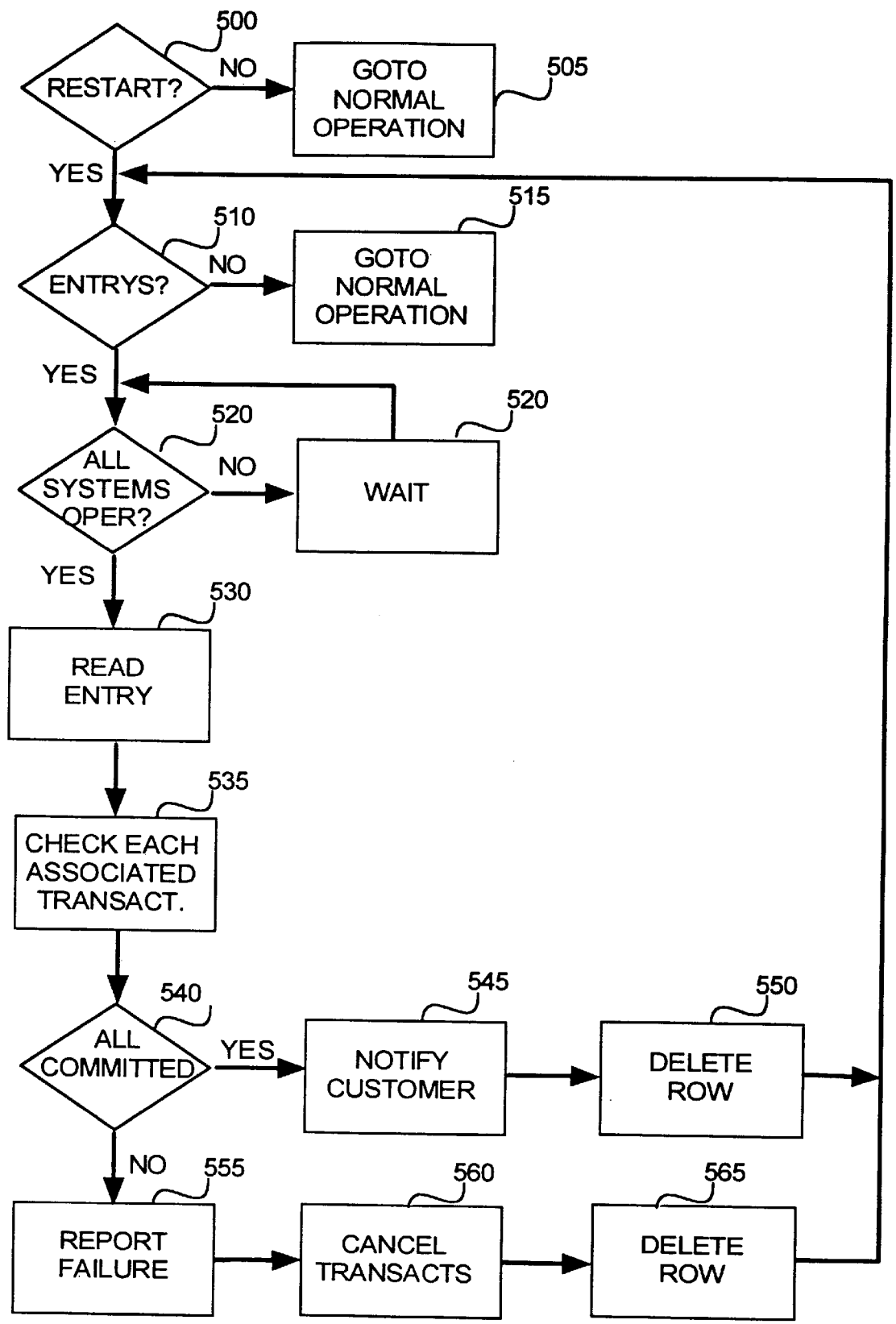
Fig_5

SYSTEM LOGGING USING EMBEDDED DATABASE

This is a Continuation of application Ser. No. 08/174,963, filed Dec. 29, 1993 now abandoned, the disclosure of which is incorporated by reference.

BACKGROUND OF THE INVENTION

The present invention relates generally to complex transactional systems. More specifically, the present invention relates to an improved system that provides total system data robustness through system logging using an embedded database.

Valuable information is often stored in electronic form and recorded in an electronic database for ease of access. There are many database systems, private, commercial, and governmental, that store important information. Owners or users of these databases sometimes desire to consolidate information distributed across several of the database systems.

It is not always possible to merge the various databases into a single database system. Therefore various solutions to providing a single synchronized, consolidated database system have developed. These solutions are often quite complex, requiring access to many different database systems. Desired changes to data can often affect data stored in several of the databases.

Complex transactional systems employing software often have a requirement of data robustness. Robustness herein means an ability of the system to withstand operational failures, including sudden, unexpected and drastic hardware failure. In other words, in the event of a failure of one or more components of the system, the system must be able to resume operation without data loss following correction of the failure.

To achieve data robustness in the prior art, complex systems typically employ a log file. The log file is a system created file that is a persistent record of requested transactions along with their requested changes to system data. A system manager ensures that any log file data is copied to a stable storage medium prior to irrevocable changes to the system data.

In the event of a system failure, the log file data permits a recovery procedure to either undo partially-completed transactions, or carry any particular partially-completed transaction forward to completion.

Ideally, log file systems have high performance attributes, data robustness, and provide data synchronization for coordinating transactions initiated by different system clients. Sometimes implementing a log file system requires a significant engineering expenditure to simultaneously provide all these desired features.

FIG. 1 is a block diagram of a conventional system employing a logging file. The system 50 includes a controller 52 coupled to a first transactor 54 and a second transactor 56. First transactor 54 uses a first resource list 58 and second transactor 56 uses a second resource list 60. A combination of first transactor 54 and first resource list 58 produce first database 62. Similarly, a combination of second transactor 56 and second resource list 60 produce a second database 64.

Database 62 and database 64 operate in conventional fashion and details of their operation will not be described further. Controller 52 interfaces to each of the databases and records events to a separate log file 70. Log file 70 is coupled to controller 52 and records initiated and committed transactions in a well-known fashion.

SUMMARY OF THE INVENTION

The present invention provides apparatus and method for simply, efficiently and economically providing log file-like robustness and high performance in complex database systems without extensive engineering costs.

According to one aspect of the invention, it includes two independent and incompatible database systems that control allocation of particular resources, such as used by airlines or car rental agencies for example. Each database has a transactor and a resource list. The transactor and the resource list work together to associate a particular transaction ID with a particular resource. Once committed, the transaction ID is permanently associated with the identified resource.

An integrator merges the functionality of the two database systems into a combined, integrated, synergistic system, without changing either system. The integrated system includes a logging function without the system employing a specially-designed external logging file to provide the necessary robustness. The logging function of the preferred embodiment is implemented by creation of a system table in one of the databases, exploiting the robustness inherent in database designs and thereby avoiding redundant and expensive creation of a high performance logging file.

In operation, the integrator receives requests for coordinated resource reservations, requiring a reservation from the resource lists. The integrator initiates appropriate reservation transactions in the databases. These reservations are not committed at this time. After receiving unique identifiers from each transactor, the integrator records the information into a new row of the system table.

Thereafter, the integrator instructs the transactors to commit their reservations, and upon receiving acknowledgment from the respective transactors of the commitment of the resources, the integrator deletes the appropriate row from the system table.

The system table provides the desired robustness to recover from failures of the system without degrading performance and without significant software engineering costs. There is a simple class of failure that the system is able to process that does not require use of the system table. This simple failure occurs when one of the transactors fails before returning an identifier. If such an event occurs, the other transactor is notified of the failure, instructed to cancel its corresponding reservation, and the system deletes the appropriate row from the system table.

For other failures of the system, the system table provides error recovery information. The integrator enumerates the system table to locate initiated activities. For each row, the integrator determines whether all the transactions in that row completed or not. When completed, the integrator notifies the customer and deletes the row. Should the integrator discover that one activity identified in a row was not completed, all related transactions are canceled and the row is deleted.

Reference to the remaining portions of the specification and drawings will realize other features and advantages of the present invention. In the drawing, similarly numbered items in the different figures represent the same, or functionally equivalent, structures.

BRIEF DESCRIPTION OF THE DRAWING

FIG. 1 is a block diagram of a conventional system employing a logging file;

FIG. 2 is a block diagram of a preferred embodiment of the present invention;

FIG. 3 is a functional representation of a preferred embodiment of the system-table;

FIG. 4 is a flowchart depicting routine operation of an integrated system illustrated in FIG. 2; and FIG. 5 is a is a flowchart illustrating error recovery procedures.

DESCRIPTION OF THE PREFERRED EMBODIMENTS

FIG. 2 is a block diagram of a preferred embodiment of the present invention. An integrated system 100 includes an integrator 102, a first database 104 and a second database 106. First database 104 and second database 106 are incompatible with each other due to software or hardware differences. Therefore, integrator 102 communicates in well known fashion to first database 104 over a first communication channel 110 and communicates to second database 106 over a second communication channel 112. Integrator 102 can be implemented as part of the data processing equipment making up first database 104 or second database 106, or as an independent system (as shown) or even as a distributed system, as well-known in the art.

First database 104 includes a first transactor 150 and a first resource list 152. Second database 106 includes a second transactor 160 and a second resource list 162. First transactor 150 and second transactor 160 are each functionally equivalent to a database engine. As well known, database engines create, query, modify and delete data from data sets. Details of database engine construction and use go beyond the scope of the present invention, therefore those details will not be described further.

Additionally, integrator 102 creates a system table 200 in first transactor 150 and interfaces to system table 200 by a third communication channel 210. Third communication channel 210 could be implemented as part of first communication channel 110, but is shown separately in FIG. 2.

FIG. 3 is a functional representation of a preferred embodiment of the system table. System table 200 includes three columns, a first column 300 for customers, a second column 302 for unique identifiers from first transactor 150, and a third column 304 for unique identifiers from second transactor 160.

System table 200 includes a plurality of rows 310. Each row $310_i$ in system table 200 associates (i) a customer in first column 300 with (ii) a unique transaction identifier in second column 302 from first transactor 150 and (iii) a unique transaction identifier in third column 304 from second transactor 160. The number of rows in system table 200 at any given time is equal to the number of simultaneous users system 100 is processing. A maximum number will be application and hardware specific.

FIG. 4 is a flowchart depicting routine operation of an integrated system illustrated in FIG. 2. Routine operation of system 100 includes steps 400 through 425. In step 400, integrator 102 receives a customer identification (the customer's name for example), and specific resource reservation requirements. Typically, the resource reservations are conditional or dependent upon each other. Therefore, two or more transactors will be necessary to satisfy the customer's request.

After obtaining the customer's requirements, system 100 advances to step 405 to initiate non-final reservations in each of the transactors. Non-final reservations are those that are initiated but not committed. In response to the initiation of the reservation process, the transactors each return a unique identifier associated with the reservation request.

Thereafter, system 100 performs step 410 that creates and commits a new row in system table 200. System table 200 stores the customer identifier, and the corresponding unique transaction identifiers obtained from the transactors. The commitment of the row ensures that the information is recorded to system 100 and relies on the inherent robustness of database 104 to recover from errors. It is typically a requirement of major database systems that they be robust. Using the previously designed and implemented database exploits the robustness to provide robustness for the integrated system without needlessly designing an independent logging system.

Committing an operation to a database as used herein refers to the common concept used in the database art: committing a process or data means whatever processing that a database must perform in order to guarantee that the requested data operation can and will be carried out. These commitment processes are implemented differently for different database systems and for different hardware configurations as well known and will not be further described herein.

At step 415 following the commitment of the row to system table 200, system 100 notifies the customer of the unique identifiers.

Step 415 follows step 410 and is not executed until the commitment of the new row of system table 200. That is, until integrator 102 receives whatever acknowledgment of the commitment of the row into system table 200, system 100 will not advance to step 415. After the commitment, system 100 is guaranteed that the necessary data has been recorded into system table 200.

After step 415, system 100 issues appropriate commands and unique identifiers to first transactor 150 and to second transactor 160 to have them commit the pending resource reservations at step 420. Again, the commit procedure guarantees that the data will be processed and acted upon in accordance with the instructions. Following step 420 (after the commitment), system 100 deletes the row from system table 200 that corresponds to the transaction group committed in step 420.

FIG. 5 is a is a flowchart illustrating error recovery procedures. Except for the failure of a transactor at step 405 of FIG. 3, system 100 executes steps 500 through 565 for error recovery. The failure at step 405 of one transactor to return an identifier results in system 100 instructing any transactors that have returned a unique identifier, or that are processing a request for an identifier, to cancel the pending reservation. If the cancellation is successful, system 100 notifies the customer and will delete any partial row from system table 200.

Periodically, system 100 executes step 500 to determine whether there has been a system restart, such as after a power failure or system reset. If no restart, system 100 advances to step 505 and returns to normal operation (i.e., it executes steps 400 through 425 of FIG. 3).

If the test at step 500 indicates that system 100 restarted, system 100 advances to step 510. Step 510 is a test to determine whether there are any entries in system table 200. If there are none, system 100 advances to step 515 to return to normal operation. If the test at step 510 finds one or more entries in system table 200, a particular one entry is selected and system 100 advances to step 520.

Step 520 tests whether all the necessary transactors are operational. If not, the system 100 advances to step 525 to pause before returning to step 520 to test the transactors' condition again. Steps 520 through 525 repeatedly cycle until all the necessary transactors are ready.

When the all transactors are ready, system 100 advances to step 530 to read a particular one entry from system table 200. Thereafter, system 100 advances to step 535 to initiate checking of each associated transaction of the selected row from system table 200. To initiate checking, system 100 interrogates the transactors as to the status of the resource reservations associated with the unique identifiers in the particular one entry.

After interrogating the transactors, system 100 advances to step 540 to test whether all the reservations associated with the identifiers are committed. If they are, system 100 advances to step 545 to notify the customer that its reservations have been made, and then advances to step 550 to delete the row from system table 200. Thereafter, system 100 returns to step 510 to determine whether system table 200 includes any additional entries.

However, if at step 540, system 100 determines that all of the associated reservations have not been committed, it advances to step 555. At step 555, system 100 reports failure of the reservation to the customer. System 100 next, at step 560, instructs the transactors to cancel any reservations or pending reservations, and thereafter advances to step 565 to delete the row from system table 200. Thereafter, system 100 returns to step 510 to determine whether system table 200 includes any additional entries.

In conclusion, the present invention provides a simple, efficient solution to a problem of integrating disparate database systems while maintaining data robustness and high performance without use of a logging file. While the above is a complete description of the preferred embodiments of the invention, various alternatives, modifications, and equivalents may be used. For example, while the above description includes two transactors, simple extension of the concepts herein presented enable use of three or more transactors.

The preferred embodiment provides for the system table to be created in one of the existing database systems storing some of the desired information. In some instances, the integrator may not have sufficient rights to create a table in one of the database systems, such as when the database is owned by another party. To create a system table in this situation, the integrator uses an independent database system that provides the desired level of data security.

Therefore, the above description should not be taken as limiting the scope of the invention which is defined by the appended claims.

What is claimed is:

1. A data management method, comprising the steps of:

receiving from a requester a data modification request including a first request for a particular one of a first resource type and a second request for a particular one of a second resource type;

initiating a first non-final data modification for said first request in a first database management system storing data relating to said first resource type, said first database management system returning a first identifier identifying said first non-final data modification;

initiating a second non-final data modification request for said second request in a second database management system different from and incompatible with said first database management system, said second database management system storing data relating to said second resource type, said second database management system returning a second identifier identifying said second non-final data modification;

creating a system logging table in a database of said first database management system, said system logging table for storing system logging data;

storing an entry in said system table that associates said requester with said first identifier and said second identifier; and thereafter instructing said first database management system and said second database management system to commit, respectively, said first non-final data modification and said second non-final data modification.

2. A data management error recovery method, comprising:

determining whether an entry exists in a system logging table created in a database of a database management system, wherein said entry would associate a requester with both a first data modification request of a first resource type from a first database management system and a second data modification request of a second resource type from a second database management system different from and incompatible with said first database management system; and thereafter checking a first status of said first data modification request, when said entry exists in said system logging table, by interrogating said first database management system to determine whether a first data modification corresponding to said first data modification request is committed;

checking a second status of said second data modification request, when said entry exists in said system logging table, by interrogating said second database management system to determine whether a second data modification corresponding to said second data modification request is committed; and thereafter notifying said requester of said first status and said second status;

canceling, when any one of said first and second data modifications are not committed, any committed ones of said first and data modifications; and thereafter deleting said entry from said system logging table, wherein the step of determining further comprises determining whether said entry exists in said system logging table created in said first database management system.

* * * * *